United States Patent Office 3,761,381
Patented Sept. 25, 1973

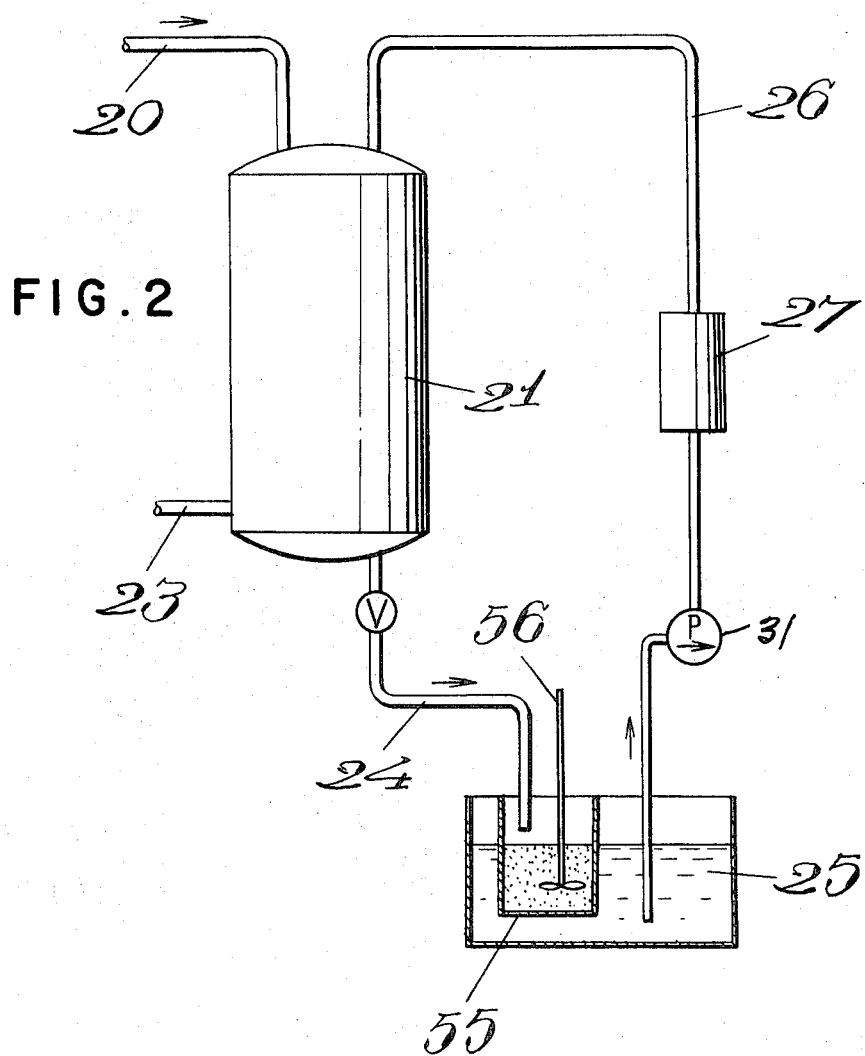

3,761,381
PLATING WASTE RECOVERY UNIT
Aisaburo Yagishita, 50 Kamejima-cho, 3-chome, Nakamura-ku, Nagoya, Japan
Continuation-in-part of abandoned application Ser. No. 66,397, Aug. 24, 1970, which is a division of application Ser. No. 587,607, Oct. 18, 1966, now Patent No. 3,542,651. This application Aug. 16, 1972, Ser. No. 281,055
Int. Cl. B01k 3/00; C02b 1/42
U.S. Cl. 204—238                5 Claims

ABSTRACT OF THE DISCLOSURE

In a unit for reclaiming plating wastes containing chromic acid and the like, the rinse liquid, from one of a plurality of wash tubs into which plated articles are dipped successively to rinse off the plating solution, is circulated through an ion exchange column, where it passes through a resin layer that removes chromic acid and other impurities before the liquid is returned to the wash tub. Periodically, or when the resin becomes saturated with chromic acid, it is regenerated by pumping a solution of caustic soda through the exchange column, thus producing a sodium chromate solution to which barium hydroxide is added to produce barium chromate, which is filtered out of the caustic soda solution before the latter is again used for regeneration purposes.

---

Figure 1:
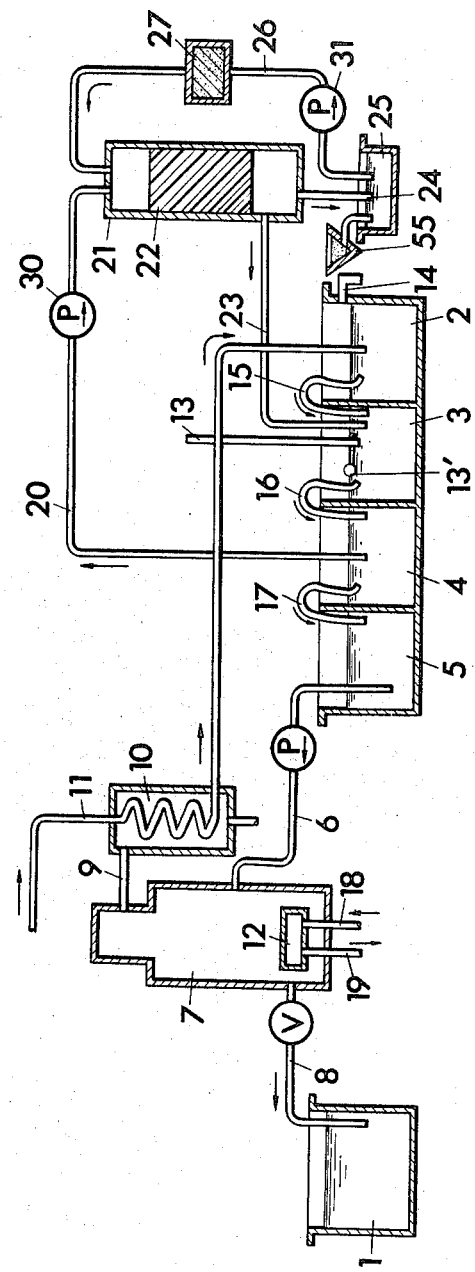

This application is a continuation-in-part of my co-pending U.S. patent application 66,397, filed Aug. 24, 1970, now abandoned, which in turn is a division of my application Ser. No. 587,607, filed Oct. 18, 1966, now Pat. No. 3,542,651 issued Nov. 24, 1970.

This invention relates to a unit for disposal of plant wastes. More particularly, this invention relates to a unit for recovery of wastes such as plating wastes containing chromic acid and the like, from metal finishing plants.

In a number of industries involving the operation of rinsing the products from chemical treatment processes, the amount of effective chemicals in the rinse liquid is considerable, and recovery of such chemicals has had great economical significance. Moreover, such rinse liquids, as a caustic soda solution from a mercerizing process in the fiber industry or a plating solution in the plating industry, would result in considerable pollution of streams if they were discharged from rinsing operations following mercerizing or plating operations. Thus, the recovery of such chemicals has been regarded as a necessity from the standpoint of the ecology and particularly of the quality of streams.

In general, the kind of chemicals in the rinse liquids varies from one rinsing operation to another. Most of those liquids are appreciably diluted solutions as compared with the original plating solution; and recovery of chemicals in the rinse liquid is a matter of difficulty because of the expense involved. In a minority of cases, however, recovery of the expensive chemicals discharged from rinsing operations following chemical treatment processes is well worthwhile; and a recovery unit that might work out in an economical and simplified manner has been in demand.

Hence, an object of the present invention is to provide a unit which attains recovery of chemicals contained in a rinse liquid by collecting highly contaminated rinse liquid and returning the same to the operating tank, such as a plating tank, while utilizing an ion exchange system.

Another object of the present invention is to provide a recovery unit that obviates discharge of waste water containing toxic chemicals from the plant and through which savings of effluent water may be attained.

A still further object of the present invention is to provide a plant waste disposal unit so made that rinse water, containing a minor quantity of plating solution etc. adhering to the ware being transferred to the wash water tubs, is passed through an ion exchange resin layer for adsorption and removal of ions and the purified water thus obtained through ion exchange is circulated to one of the wash water tubs for reuse as wash water, while the hot water from a condenser connected to the heating and concentrating tower is admitted to another of the wash water tubs.

A still further object of the present invention is to provide a plant waste disposal unit equipped with an ion exchange tower which entails hardly any expense in the regeneration of the ion exchange resins.

The present invention will be described hereinbelow with reference to certain embodiments thereof as illustrated in the accompanying drawings, in which:

FIG. 1 is an explanatory view showing partly in section a plating waste recovery unit equipped with an ion exchanger made in accordance with this invention; and FIG. 2 is a partially sectional, partially elevational view showing a modified embodiment of the ion exchanger.

In each figure corresponding parts are designated by corresponding reference numerals.

Referring to FIG. 1, by way of giving a detailed explanation of the unit according to the present invention, a plurality of wash water tubs 2, 3, 4, 5 are connected in series with the plating tank 1, the fourth tub 2 among the wash water tubs serving as the hot wash water tub.

The wash water tubs 2, 3, 4, 5 are connected one with the other by means of siphons 15, 16 and 17, and the fourth tub 2 is fitted with an overflow pipe 14. To the first wash water tub 5 is connected a heating and concentrating tower 7 via feed pipe 6. Heating of the liquid to be concentrated is effected by means of steam sent forth into a heating unit 12, enclosed inside said tower 7, via pipe 18; and waste stream is exhausted via pipe 19. Furthermore, a condenser unit 10 is annexed to the heating and concentrating tower 7 to condense the vapor evaporated from the tub water supplied into said tower heated by the heating steam. Cooling water is passed through a helically wound cooling pipe 11 inserted into said unit 10; and this water is heated in the condenser unit 10 and passes through said pipe 11 to the fourth wash water tub or hot wash water tub 2. Tub water from the first wash water tub 5 is pumped into the heating and concentrating tower 7 via feed pipe 6 and is heated there and concentrated to the level equivalent to that of the plating solution contained in the plating tank 1 before it is restored to the plating tank via pipe 8. Water is supplied to the third wash water tub 3 via pipe 13. The supply of the water is regulated by a balltap 13' to keep the level of the tub water constant.

Supposing that a plating operation comprising moving the plated ware from the plating tank 1 and immersing the same consecutively in a series of wash water tubs is conducted in a chromium plating plant employing 10 kg. of chromic acid per eight hours a day, and that the capacity of the first wash water tub 5 is 200 liters, the metallic articles plated in the plating tank 1 are washed consecutively in the wash water tubs 5, 4 and 3 and finally in the hot wash water tub 2. If the above mentioned recovery unit is not utilized, approximately 85 percent of the chromic acid contained in the plating tank 1 would go onto the plated ware and be carried off from the plating tank 1; and the chromic acid concentration levels of the wash water tubs 5, 4, 3 when the operation is finished would be approximately 45 g./l., 6.5 g./l. and 0.6 g./l. respectively.

On the other hand, if the recovery unit is utilized, supposing that the evaporative capacity of the heating and concentrating tower 7 is 100 kg./h. and that the capacity of the first wash water tub 5 is 200 liters and other conditions are also the same as above, the tub water contained in the tub 5 is diminished by one-half per hour, and the tub 5 is supplied with wash water from the second, third and fourth wash water tubs by means of siphons 15, 16, 17. The wash water contained in the wash water tubs 5, 4, 3 is diluted; and the chromic acid concentration levels of the tubs 5, 4, 3 are maintained respectively at 15 g./l., 1 g./l and 0.08 g./l., or thereabout.

As will be seen from the above, the concentration level is apparently reduced to about 1/7–1/8 by using of the recovery unit as compared with that obtained when such unit is not used. However, such reduced concentration is not yet sufficient in view of the standards for preventing the environmental pollution.

An ion exchange column 21 as shown in FIG. 1 is annexed for instance to the second water tub 4 and to the third water tub 3. In this embodiment, tub water contained in the wash water tub 4 is pumped therefrom by pump 30 via pipe 20, and is passed through the exchange column 21, where the tub water is in contact with an ion exchange resin layer 22 provided in said column, whereby chromic acid etc. are adsorbed by the resin layer 22 and removed from the water. The purified water from the column 21 is returned by pipe 23 to the wash tub 3 for reuse as wash water.

The guages of the pipes 20 and 23 are so designed that a prescribed flow rate of wash water circulating through pipes 20, 23 may be established to effect prompt removal of chromic acid etc., which are carried into the wash water tub 4 along with the plated articles. Normally, such capacity may be ten times the capacity of the wash water tub 4.

In treating tub water containing chromic acid, the reaction of the cation exchange resin contained in the cation exchange resin column 21 is shown as follows:

where R is a resin base.

In regenerating the cation exchange resin saturated with chromic acid, the tank 25 is filled with a regenerant such as 4% caustic soda solution and the said tank 25 is supplied with barium hydroxide in a suitable amount from the feeder 55. In the first place, caustic soda solution is pumped by pump 31 into the ion exchange column 21 via pipe 26, which is connected at one end through pump 31 with tank 25, and at its other end through a filter 27 with ion exchange column 21, for regeneration of the cation exchanger resin layer whereby a reaction takes place as shown in the following formula:

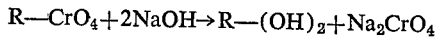

The chromic acid adsorbed to the cation exchange resin layer is discharged into the regenerant tank 25 via drain pipe 24 as sodium chromate solution together with excess caustic soda solution, where the sodium chromate solution is reacted with barium hydroxide, which is almost insoluble in the castic soda solution and is converted to barium chromate, as shown in the following formula:

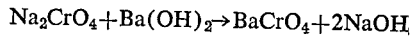

The barium chromate is then filtered off by the filter 27, and caustic soda solution alone is supplied to the exchange column 21 to repeat the above-mentioned reaction.

Referring to the unit shown in FIG. 1, the tub water contained in the first wash water tub 5 has the utmost chromic acid concentration, and is supplied to the heating and concentrating tower 7 for heating and concentration, and for subsequent return to the plating tub 1.

The tub water in the wash water tub 4 situated ahead of the hot wash water tub 2, and containing a minor quantity of plating solution carried over from the wash water tub 5 with the plated articles, is pumped into the cation exchange column 21 to remove plating chemicals through ion exchange. Purified water from the cation exchange column 21 is returned by pipe 23 to the wash water tub 3 for reuse as wash water. On the other hand, cooling water is passed through helical pipe 11 in the condenser unit 10 of the heating and concentrating tower 7 for cooling of the vapor, and is there heated, and then supplied to the hot wash water tub 2 for use as hot wash water which rinses the plated metal articles and consequently dries them.

FIG. 2 shows another embodiment of the ion exchange resin regenerating device, wherein a water permeable vessel 55 is accommodated in the regenerant tub 25. This vessel contains barium hydroxide which is almost insoluble in caustic soda solution and is stirred up by a stirrer 56. The other parts are the same as those mentioned with reference to FIG. 1.

For better results, the pipes 8 and 6 of the recovery unit of the present invention as shown in FIG. 1 may be provided respectively with a chemically reacting filter and a cation exchange column to remove impurities contained in the tub water.

As described in the foregoing, according to the present invention, toxic chemicals in a plating waste of high concentration are recovered and reclaimed as values of a plating solution and only appreciably diluted solution is passed through an ion-exchange resin for adsorption of such toxic chemicals, so that the amount of ion-exchange resin required therefor can be much reduced and the life of said ion-exchange resin is prolonged.

Further, according to the present invention, the condensation water heated in the condenser is reutilized for hot-water washing, saving supply of water, and the purified water obtained through ion exchange is reused as wash water, also further saving water supply.

The present invention has further effects that the rinse waste is kept in concentration far below the standards without employing an additional waste treating apparatus and that the toxic components adsorbed by the ion-exchange resin can be reutilized as chemicals for a plating solution after treated with a reducing agent.

Having thus described my invention, what I claim is:

1. A unit for recovery of wastes from metal finishing plants, such as plating wastes containing chromic acid and the like, comprising a plating tank, a plurality of wash water tubs into which plated metal articles transferred from said plating tank are to be dipped consecutively to rinse off the plating solution adhering to said articles, siphons connecting said tubs serially with one another, the last tub in the series being a hot wash water tub, means to suck up tub water contained in the wash water tub into which the plated metal articles are dipped first, a heating and concentrating tower to receive the tub water sucked up by the aforementioned means and to concentrate said tub water to the plating strength, means for conveying the concentrated water from said tower to said plating tank, a condenser connected to said heating and concentrating tower, a pipe connecting said condenser with said hot wash water tub for supplying hot water to said hot water wash tub, an ion exchange column, and means for circulating tub water from one of the tubs other than said first and last tubs in the series through said ion exchange column and back to another of said tubs other than said first and last tubs, said ion exchange column containing an ion exchange resin for removing chromic acid and the like from the tub water circulated through said column.

2. A unit as defined in claim 1 including means for regenerating said ion exchange resin comprising a reservoir for a liquid for regenerating said ion exchange resin, a first conduit connecting the lower end of said column to said reservoir, a second conduit connecting said reservoir to the top of said column, means for pumping regenerating liquid through said second conduit from said reservoir to said column, a container adapted to hold a liquid for regenerating by-products in said reservoir to a compound substantially insoluble in said regenerating liquid, means connecting said container to said reservoir, and a filter in said second conduit for filtering said compound from the liquid pumped to said column.

3. A unit as defined in claim 2, wherein said container is positioned above said reservoir and means is provided for periodically dispensing a quantity of barium hydroxide from the last-named container into said reservoir.

4. A unit as defined in claim 2, having a water permeable container for barium hydroxide mounted in said reservoir, and a stirring device projecting into said last-named container to stir the contents thereof.

5. A unit as defined in claim 1 including a heat exchanger coupled to said tower to receive from said tower steam generated therein, and means for conducting water through said heat exchanger and delivering it to said last tub.

References Cited

Joseph M. Culotta: Plating, pp. 545–548, June 1965.

T. J. Fadgen: Sewage and Industrial Wastes, vol. 24, pp. 1101–1107 (1952).

C. Fred Gurnham: Plating, pp. 873–878, August 1957.

GERALD L. KAPLAN, Primary Examiner

U.S. Cl. X.R.

204—232, 237, 239, 240, 241; 210—38